(12) United States Patent
Baghsorkhi et al.

(10) Patent No.: US 12,086,657 B2
(45) Date of Patent: Sep. 10, 2024

(54) UNIFIED PROGRAMMING INTERFACE FOR REGRAINED TILE EXECUTION

(71) Applicant: Intel Corporation, Santa Clara, CA (US)

(72) Inventors: Sara Baghsorkhi, Los Gatos, CA (US); Mohammad R. Haghighat, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/305,683

(22) Filed: Apr. 24, 2023

(65) Prior Publication Data

US 2023/0289243 A1    Sep. 14, 2023

Related U.S. Application Data

(63) Continuation of application No. 16/722,798, filed on Dec. 20, 2019, now Pat. No. 11,663,056.

(51) Int. Cl.
*G06F 9/54*   (2006.01)
*G06F 17/15*  (2006.01)
*G06F 17/16*  (2006.01)
*G06N 3/10*   (2006.01)

(52) U.S. Cl.
CPC ............... *G06F 9/54* (2013.01); *G06F 17/15* (2013.01); *G06F 17/16* (2013.01); *G06N 3/10* (2013.01)

(58) Field of Classification Search
None
See application file for complete search history.

(56) References Cited

U.S. PATENT DOCUMENTS

| | | | |
|---|---|---|---|
| 2019/0065194 A1* | 2/2019 | Tao | G06F 9/34 |
| 2020/0065660 A1* | 2/2020 | Tran | G06F 3/0688 |
| 2020/0242189 A1* | 7/2020 | Chatterjee | G06F 8/447 |

* cited by examiner

*Primary Examiner* — Craig C Dorais
(74) *Attorney, Agent, or Firm* — Akona IP PC (57) ABSTRACT

Systems, apparatuses and methods may provide for technology that detects a tensor operation in an application, wherein the tensor operation has an unspecified tensor input size, determines the input tensor size at runtime, and selects a partition configuration for the tensor operation based at least in part on the input tensor size and one or more runtime conditions. In one example, the technology searches a lookup table for the input tensor size and at least one of the runtime condition(s) to select the partition configuration.

20 Claims, 6 Drawing Sheets

UNIFIED PROGRAMMING INTERFACE FOR REGRAINED TILE EXECUTION

CROSS REFERENCE TO RELATED APPLICATION

The present application is a continuation of, and claims the benefit of priority to, U.S. Non-Provisional patent application Ser. No. 16/722,798 filed Dec. 20, 2019.

TECHNICAL FIELD

Embodiments generally relate to application programming interfaces (APIs). More particularly, embodiments relate to a unified programming interface for regrained tile execution.

BACKGROUND

An instruction set architecture (ISA) may generally define the supported data types, registers, and hardware support for processor operations such as data handling, memory operations, arithmetic operations, control flow operations, and so forth. Recent developments in artificial intelligence (AI) may have led to the extension of ISAs to more explicitly support neural network training and inference operations. Software developers may therefore customize code in AI applications to take advantage of the new compute features and accelerated execution facilitated by the extended ISAs. Customization of the code, however, may be time consuming, costly, and inefficient, particularly when the application is deployed across different ISAs and processors.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
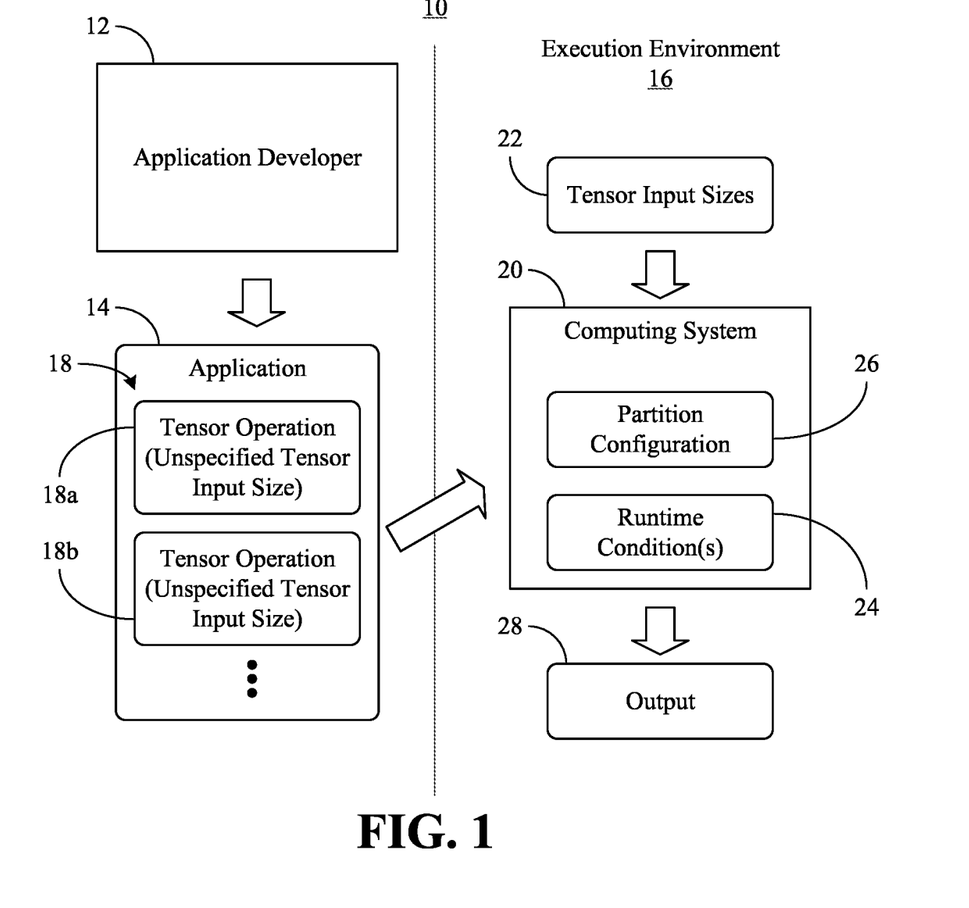
FIG. 1 is a block diagram of an example of an application deployment according to an embodiment.

Turning now to FIG. 1, a deployment scenario 10 is shown in which an application developer 12 generates an application 14 for deployment in an execution environment 16 having a computing system 20 (e.g., backend platform including one or more processor cores, not shown). The application 14 might involve the training (e.g., iterative selection of network layer weights) of a neural network (e.g., convolutional neural network/CNN, deep neural network/DNN, etc.) and/or the real-time operation of the neural network (e.g., to draw inferences with regard to image recognition, natural language processing/NLP, and so forth). In an embodiment, the application 14 is a portable application that is designed to read and write configuration settings for the application 14 into an accessible folder in the computing system 20.

In the illustrated example, the application 14 includes one or more generic tensor operations 18 (18a-18b, e.g., matrix multiply operations, convolution operations, normalization operations, rectified linear unit/relu operations, exponential linear unit/elu operations, and/or other complex instruction set computer/CISC operations). In general, a tensor may be a multi-dimensional data array that facilitates the automated classification of input data by a neural network. The multi-dimensional nature of tensors typically calls for the use of matrix-based mathematical operations, where the matrices have varying sizes (e.g., column and/or row lengths). Specifying the input tensor size when the application 14 is created by the application developer 12 may not be possible.

Accordingly, the illustrated tensor operations 18 have an unspecified tensor input size when the application 14 is created by the application developer 12. Rather, the computing system 20 may determine tensor input sizes 22 (e.g., input column and/or row lengths) for the tensor operations 18 at runtime (e.g., during neural network training and/or inferences). In an embodiment, the computing system 20 also determines one or more runtime conditions 24 (e.g., expected power consumption, matrix sparsity, hardware resource availability, etc.) and selects a partition configuration 26 for the tensor operations 18 based on the tensor input sizes 22.

In one example, the partition configuration 26 defines a first set of matrix shapes (e.g., "tile" column and width combinations) for a first tensor operation 18a and a second set of matrix shapes for a second tensor operation 18b. The partition configuration 26 may also define a first set of hardware resources (e.g., compute core pools) for the first tensor operation 18a and a second set of hardware resources for the second tensor operation 18b, where the first set of hardware resources and the second set of hardware resources are different types of hardware resources. For example, the first set of hardware resources might be a relatively light-weight (e.g., "light") compute core pool containing scalar cores, whereas the second set of hardware resources may be a relatively heavy compute core pool. The computing system 20 may use the partition configuration 26 to generate an output 28 (e.g., optimized code to preform training or inference based on runtime tensor sizes and available compute resources, etc.) from the application 14.

The illustrated solution is therefore less time consuming, less expensive, and more efficient from the perspective of the application developer 12. Indeed, the same application 14 may be deployed across different ISAs and processors much more easily because optimizations and transformations are not tied statically to a certain tensor size or tensor core by the application developer 12. Moreover, performance is enhanced by taking into account the runtime conditions 24 when generating the partition configuration 26. For example, leveraging knowledge about matrix sparsity (e.g., distribution of zero values in the matrices) may enable the selection of a relatively light compute core pool and/or a different floating point format for the operation.

Figure 2:
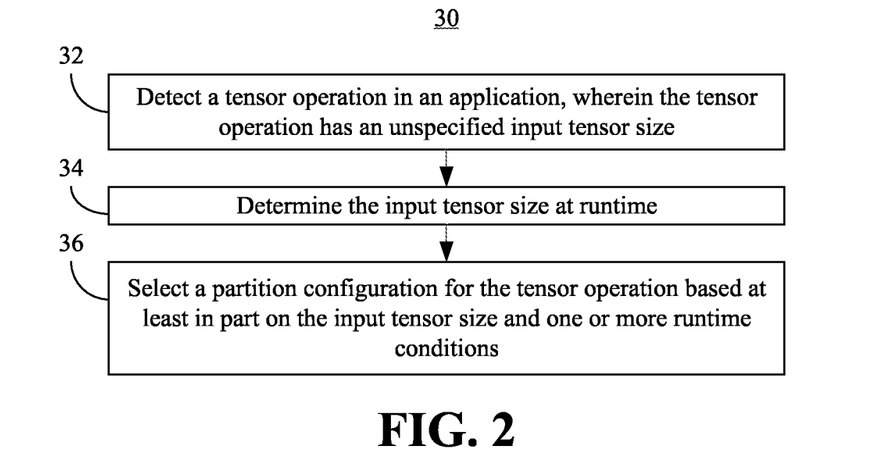
FIG. 2 is a flowchart of an example of a method of operating a performance-enhanced computing system according to an embodiment.

FIG. 2 shows a method 30 of operating a performance-enhanced computing system. The method 30 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 30 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 32 detects a tensor operation in an application, wherein the tensor operation has an unspecified input tensor size. In an embodiment, the tensor operation is generic and includes a matrix multiply operation (e.g., matmul), a convolution operation (e.g., conv2d, conv2d_transpose, conv3d), a normalization operation (e.g., l2_normalize), a rectified linear unit operation, an exponential linear unit operation, etc., or any combination thereof. The tensor operation may be detected by parsing and/or compiling the application 14 for execution. Block 34 provides for determining the input tensor size at runtime. In an embodiment, the input tensor size is determined by analyzing input data (e.g., input image, utterance, etc.) to a neural network, analyzing output data from a preceding layer in the neural network, and so forth.

A partition configuration is selected for the tensor operation at block 36 based at least in part on the input tensor size and one or more runtime conditions. In one example, the runtime condition(s) include an expected power consumption, a matrix sparsity and/or a hardware resource availability. Additionally, the partition configuration may define a first set of matrix shapes (e.g., tile sizes) for a first operation, a second set of matrix shapes for a second operation, and so forth. In an embodiment, the partition configuration further defines a first set of hardware resources for the first operation, a second set of hardware resources for the second operation, etc., wherein the first set of hardware resources and the second set of hardware resources are different types of resources. Such an approach to tile size and resource selection enables matrix compute granularities to be changed (e.g., "regrained") on-the-fly and in real-time.

Block 36 may include searching a lookup table for the input tensor size and at least one of the runtime condition(s). In this regard, since each tensor operation is typically well understood in terms of compute, memory, and communication patterns, an offline tuning/benchmarking process may be capable of capturing near optimal mappings for different tensor sizes and sets of available resources. Therefore, at runtime, based on the detected tensor sizes, and a list of available tensor cores, a table lookup might be performed by a runtime engine to retrieve the best/near optimal execution/partitioning plan along with any optimized intra-tensor-core optimized code generation (e.g., optimal tile size, etc.). If the tuning process is conducted offline, the runtime scheduling overhead may be minimal.

The illustrated method 30 therefore provides a regrained tile execution solution that enhances performance by taking into account the runtime conditions when generating the partition configuration. For example, leveraging knowledge about expected power consumption may enable the mapping of tensor operations to more power efficient core pools. The illustrated method 30 is also less time consuming, less expensive, and more efficient from the perspective of the application developer. Indeed, the same application may be deployed across different ISAs and processors much more easily because optimizations tied to specific tensor input sizes are not incorporated into the application by the application developer.

Figure 3:
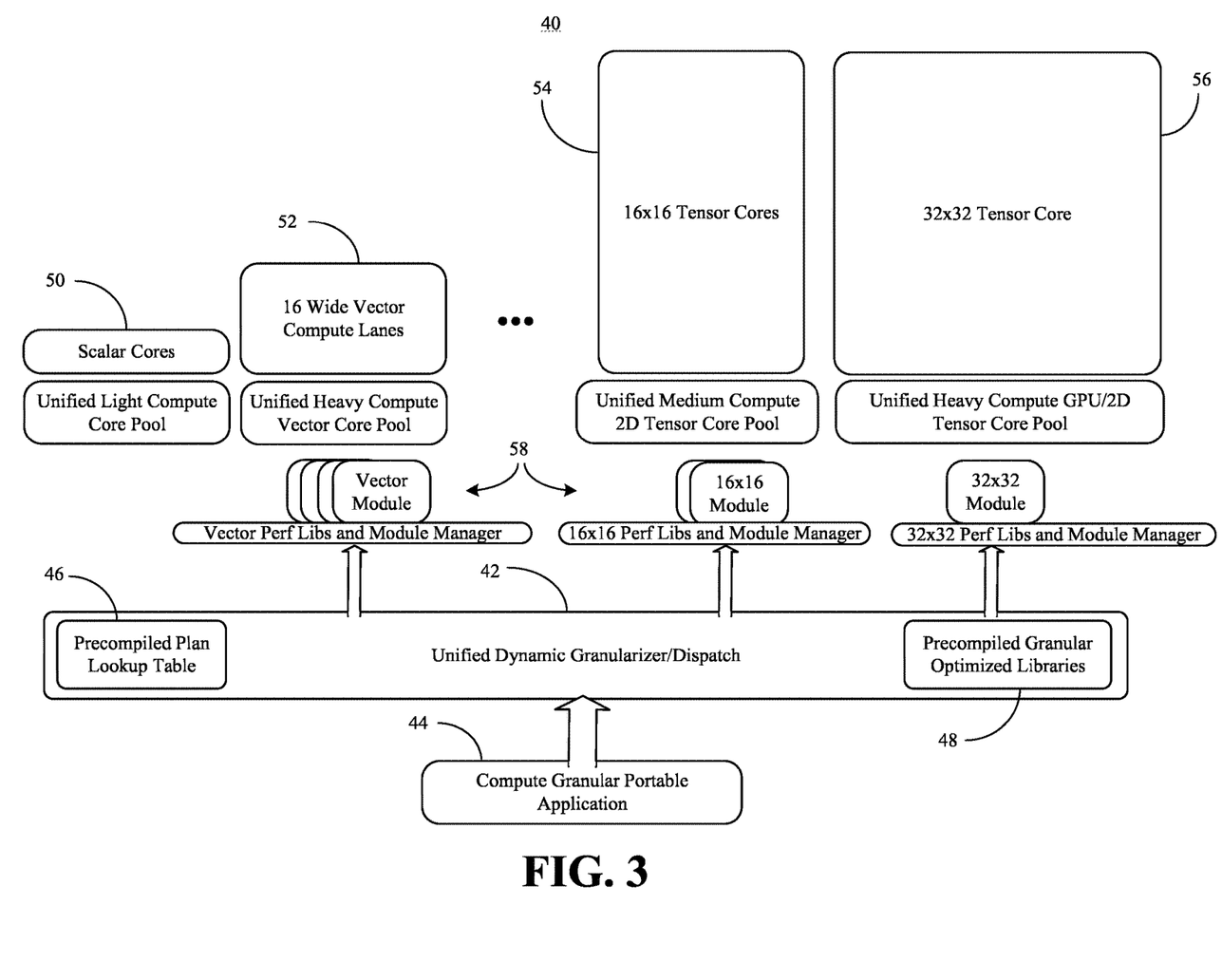
FIG. 3 is a block diagram of an example of a partition configuration according to an embodiment.

FIG. 3 shows a partition configuration 40 in which a unified dynamic dispatch 42 (e.g., "granularizer") receives a compute granular portable application 44. The dynamic dispatch 42 may be considered to be "unified" to the extent that the dispatch 42 uses a unified programming model such as, for example, ONEAPI, to configure the application 44 for execution across a heterogeneous set of hardware resources (e.g., CPU, graphics processing unit/GPU, FPGA, special-purpose accelerator, etc.). In an embodiment, the dispatch 42 includes a precompiled plan lookup table 46 that includes benchmarking data to facilitate the selection of a partition configuration for the application 44 at runtime. Additionally, a set of precompiled granular optimized libraries ("libs") 48 might include, for example, vector performance libraries, 16×16 (e.g., 16-element by 16-element) performance libraries, 32×32 (e.g., 32-element by 32-element) performance libraries, and so forth.

In the illustrated example, the partition configuration defines/specifies the use of scalar cores 50 (e.g., selected from a unified light compute core pool), sixteen wide vector compute lanes 52 (e.g., selected from a unified heavy compute vector core pool), 16×16 tensor cores 54 (e.g., selected from a unified medium compute two-dimensional/2D tensor core pool), a 32×32 tensor core 56 (e.g., selected from a unified heavy compute GPU/2D tensor core pool), and so forth. In an embodiment, the dispatch 42 generates customized modules 58 (e.g., vector modules, 16×16 modules, 32×32 module) at runtime for optimal, and potentially collaborative, execution of the application 44 on the heterogeneous tensor cores.

Figure 4:
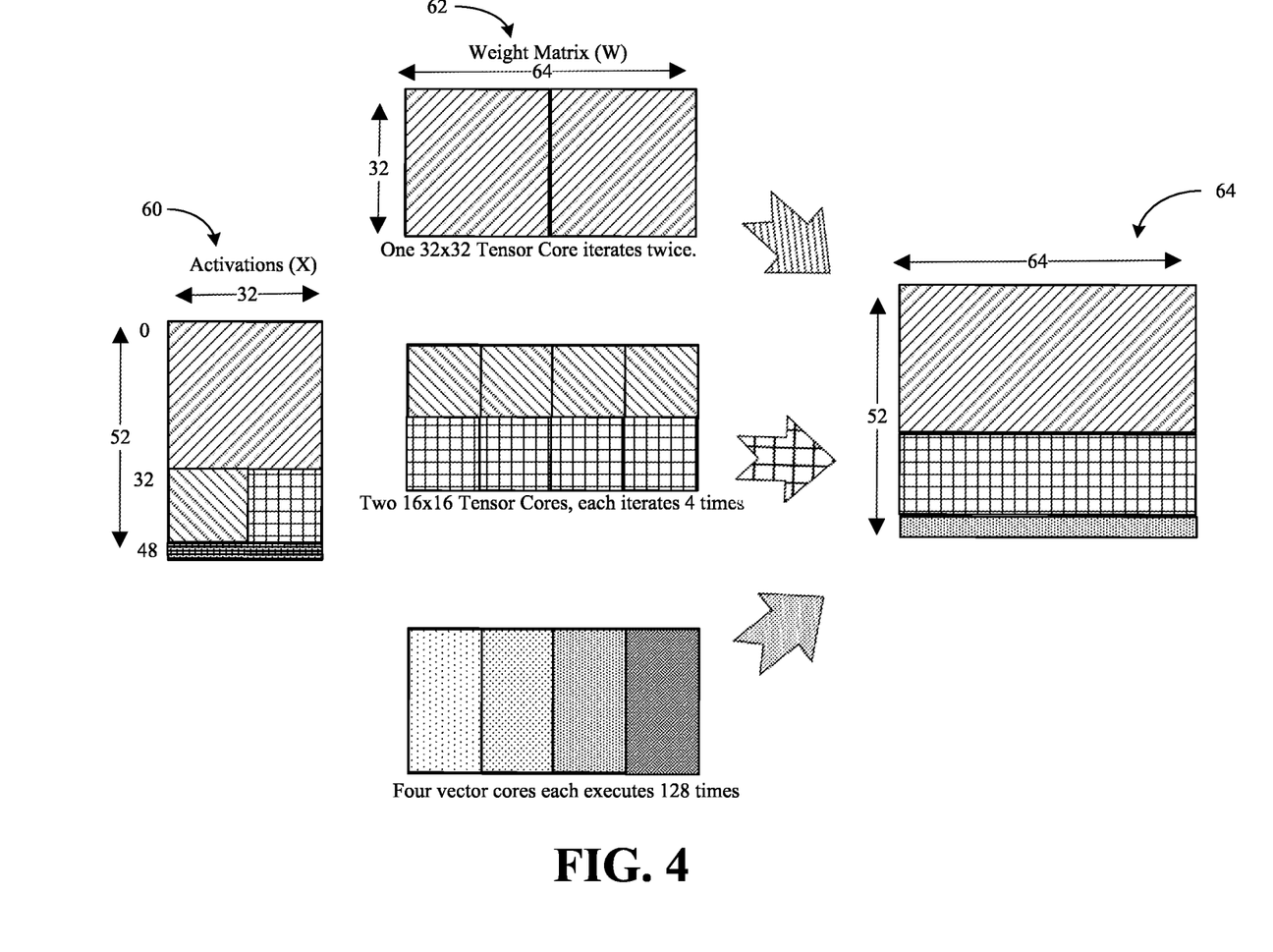
FIG. 4 is an illustration of an example of a partition configuration for a matrix multiply operation according to an embodiment.

FIG. 4 shows a partition configuration for a matrix multiply (matmul) operation between an activation matrix 60 (e.g., matrix X representing activations of a neural network layer) and a weight matrix 62 (e.g., matrix W representing weights to be applied to the activations), where Y=X·W. Particularly during training with larger batch sizes, loading the activation matrix 60 may place pressure on memory bandwidth of the core. The same may be true with respect to the weight matrix 62. Based on the offline tuning plans generated, the runtime engine may decide to partition the X·W operation, where X is a 52×32 element matrix and W is a 32×64 element matrix into three parts:

Rows 0 to 31 of matrix X, along with matrix W, are read by a "heavy duty" 32×32 compute element tensor core. The tile matmul operation is conducted twice to generate rows 0 to 31 of an output matrix 64.

Rows 32 to 47 and columns 0 to 31 of the matrix X, and the upper half of matrix W are read by a 16×16 tensor core to generate partial sums for the upper half of the output matrix 64.

Simultaneously, rows 32 to 47 and columns 32 to 63 of matrix X, and the lower half of matrix W are read by another 16×16 tensor core to generate partial sums for the upper half of the output matrix 64.

During a reduction step between the two cores, partial sums pairs are added to generate the final results for rows 32 to 47 of the output matrix 64.

Four 16-wide vector units load the last four rows of matrix X, and each vector unit processes a fourth of the columns of matrix W. Each vector unit produces a fourth of the output matrix 64 column outputs for rows 48 to 51.

Figure 5:
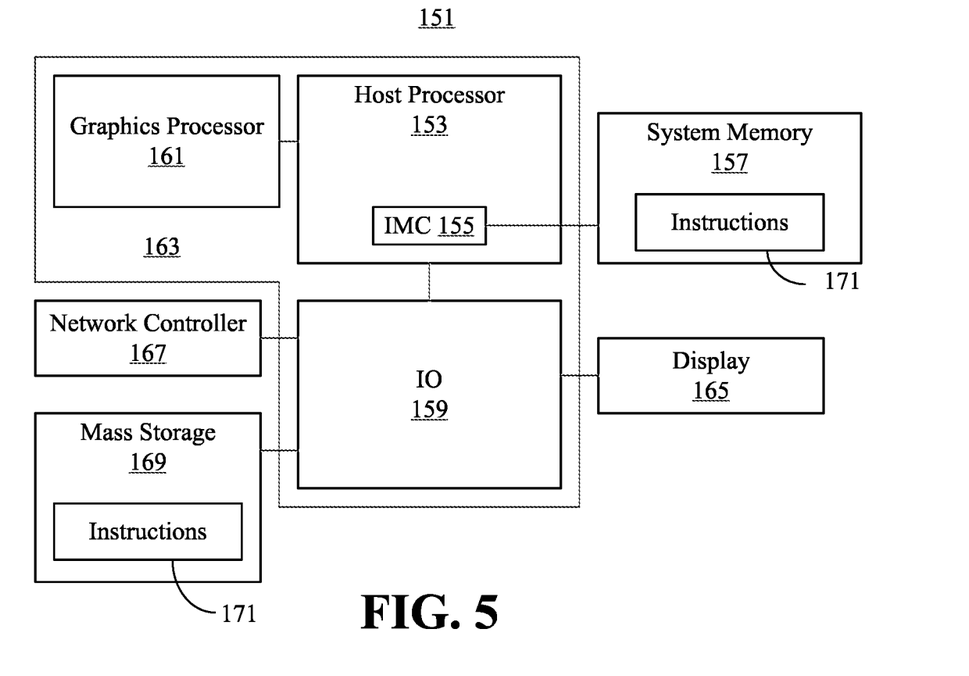
FIG. 5 is a block diagram of an example of a performance-enhanced computing system according to an embodiment.

Turning now to FIG. 5, a performance-enhanced computing system 151 is shown. The system 151 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 151 includes a host processor 153 (e.g., CPU with a plurality of cores, not shown) having an integrated memory controller (IMC) 155 that is coupled to a system memory 157.

The illustrated system 151 also includes an input output (IO) module 159 implemented together with the host processor 153 and a graphics processor 161 on a semiconductor die 163 as a system on chip (SoC). The illustrated IO module 159 communicates with, for example, a display 165 (e.g., touch screen, liquid crystal display/LCD, light emitting diode/LED display), a network controller 167 (e.g., wired and/or wireless), and mass storage 169 (e.g., hard disk drive/HDD, optical disk, solid state drive/SSD, flash memory).

In an embodiment, the host processor 153, the graphics processor 161 and/or the IO module 159 execute program instructions 171 retrieved from the system memory 157 and/or the mass storage 169 to perform one or more aspects of the method 30 (FIG. 2), already discussed. Thus, execution of the illustrated instructions 171 may cause the computing system 151 to detect a tensor operation in an application, wherein the tensor operation has an unspecified tensor input size, determine the input tensor size at runtime, and select a partition configuration for the tensor operation based at least in part on the input tensor size and one or more runtime conditions. In an embodiment, the partition configuration defines a first set of matrix shapes for a first operation and a second set of matrix shapes for a second operation. The partition configuration may also define a first set of hardware resources for the first operation and a second set of hardware resources for the second operation, where the first set of hardware resources and the second set of hardware resources are different types of resources. In one example, to select the partition configuration, the instructions 171, when executed, cause the computing system 151 to search a lookup table for the input tensor size and at least one of the runtime condition(s).

The illustrated system 151 is therefore considered performance-enhanced at least to the extent that it provides a regrained tile execution solution that takes into account the runtime conditions when generating the partition configuration. For example, leveraging knowledge about expected hardware resource availability may enable execution time to be reduced. The illustrated system 151 also saves application development time, reduces costs, and improves efficiency. Indeed, the same application may be deployed across different ISAs and processors much more easily because optimizations tied to a specific tensor input sizes or a specific tensor core are not incorporated into the application by the application developer.

Figure 6:
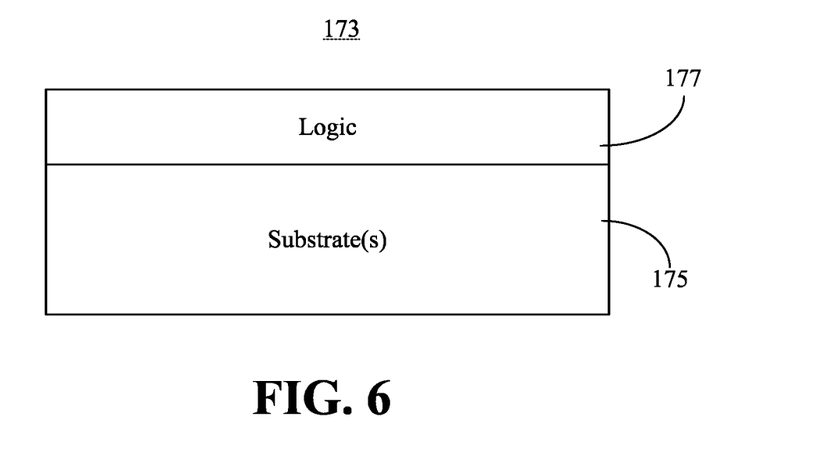
FIG. 6 is an illustration of an example of a semiconductor apparatus according to an embodiment.

FIG. 6 shows a semiconductor package apparatus 173. The illustrated apparatus 173 includes one or more substrates 175 (e.g., silicon, sapphire, gallium arsenide) and logic 177 (e.g., transistor array and other integrated circuit/IC components) coupled to the substrate(s) 175. The logic 177 may be implemented at least partly in configurable logic or fixed-functionality logic hardware. In one example, the logic 177 implements one or more aspects of the method 30 (FIG. 2), already discussed. Thus, the logic 177 may detect a tensor operation in an application, wherein the tensor operation has an unspecified tensor input size, determine the input tensor size at runtime, and select a partition configuration for the tensor operation based at least in part on the input tensor size and one or more runtime conditions. In one example, to select the partition configuration, the logic 177 searches a lookup table for the input tensor size and at least one of the runtime condition(s).

The illustrated apparatus 173 is therefore considered performance-enhanced at least to the extent that it provides a regrained tile execution solution that takes into account the runtime conditions when generating the partition configuration. For example, leveraging knowledge about expected hardware resource availability may enable execution time to be reduced. The illustrated apparatus 173 also saves application development time, reduces costs, and improves efficiency. Indeed, the same application may be deployed across different ISAs and processors much more easily because the tensor input sizes are not incorporated into the application by the application developer.

In one example, the logic 177 includes transistor channel regions that are positioned (e.g., embedded) within the substrate(s) 175. Thus, the interface between the logic 177 and the substrate(s) 175 may not be an abrupt junction. The logic 177 may also be considered to include an epitaxial layer that is grown on an initial wafer of the substrate(s) 175.

Figure 7:
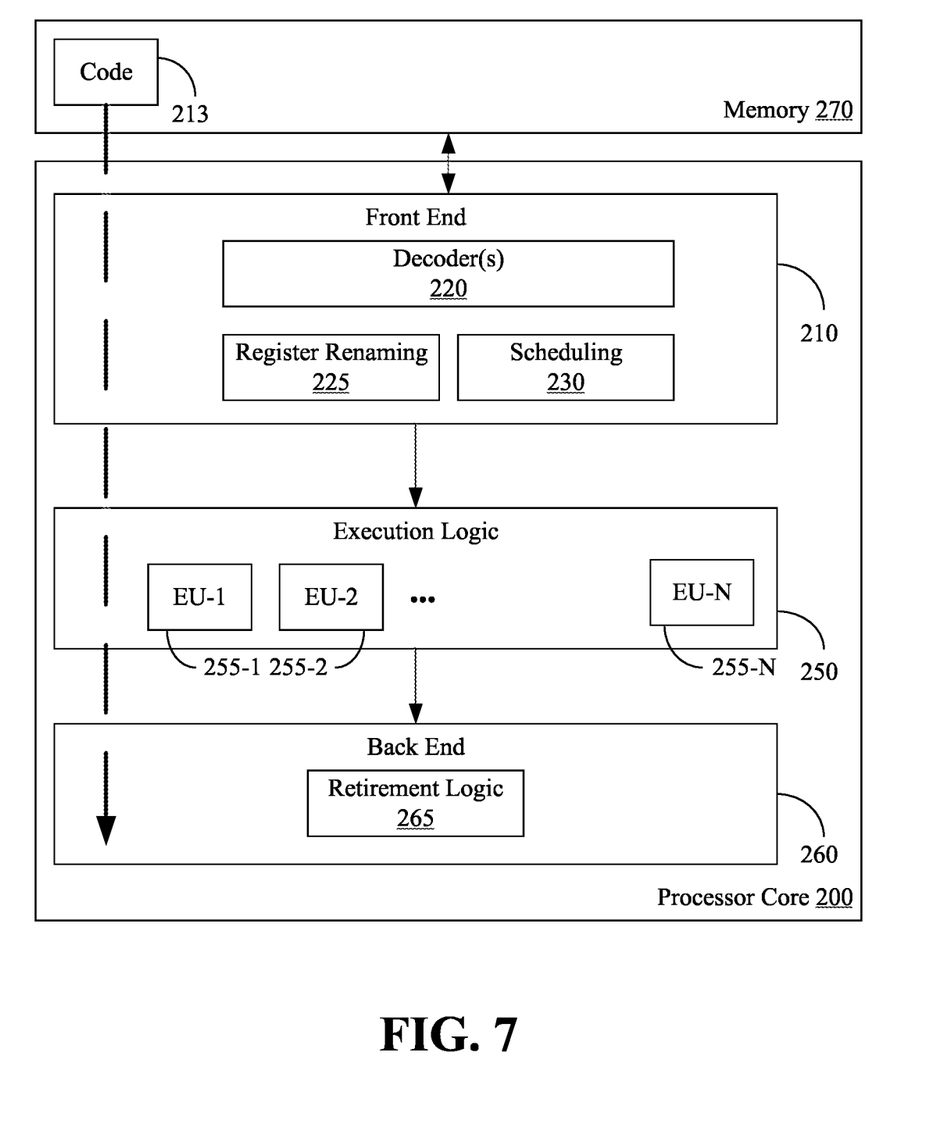
FIG. 7 is a block diagram of an example of a processor according to an embodiment.

FIG. 7 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 7, a processing element may alternatively include more than one of the processor core 200 illustrated in FIG. 7. The processor core 200 may be a single-threaded core or, for at least one embodiment, the processor core 200 may be multithreaded in that it may include more than one hardware thread context (or "logical processor") per core.

FIG. 7 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 30 (FIG. 2), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 7, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 8:
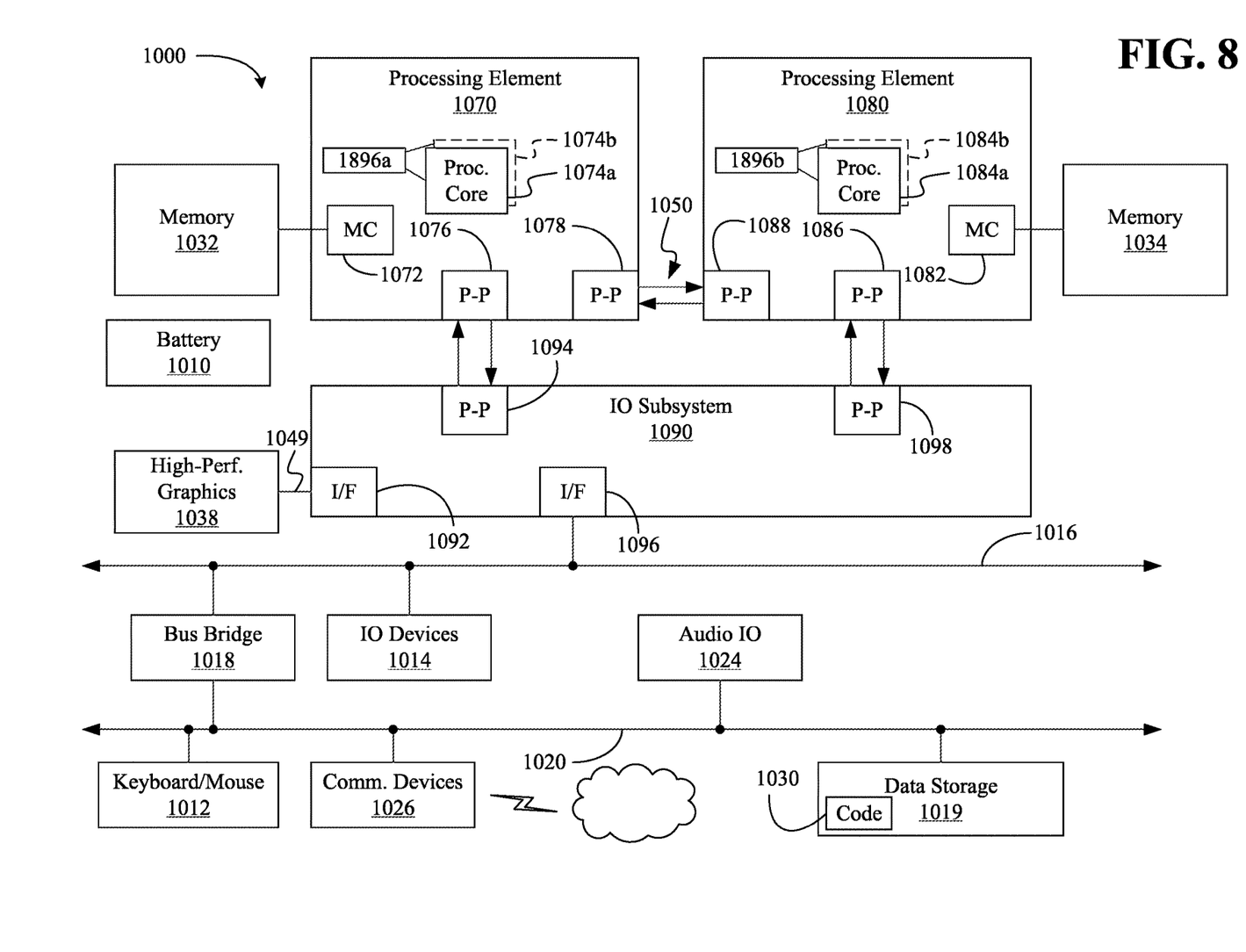
FIG. 8 is a block diagram of an example of a multi-processor based computing system according to an embodiment.

Referring now to FIG. 8, shown is a block diagram of a computing system 1000 embodiment in accordance with an embodiment. Shown in FIG. 8 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 7.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 8, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 8, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the method 30 (FIG. 2), already discussed. Further, an audio I/O 1024 may be coupled to second bus 1020 and a battery 1010 may supply power to the computing system 1000.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8.

ADDITIONAL NOTES AND EXAMPLES

Example 1 includes a performance-enhanced computing system comprising a network controller, a processor coupled to the network controller, and a memory coupled to the processor, wherein the memory includes a set of executable program instructions, which when executed by the processor, cause the computing system to detect a tensor operation in an application, wherein the tensor application is to have an unspecified input tensor size, determine the input tensor size at runtime, and select a partition configuration for the tensor operation based at least in part on the input tensor size and one or more runtime conditions.

Example 2 includes the computing system of Example 1, wherein the partition configuration is to define a first set of matrix shapes for a first operation and a second set of matrix shapes for a second operation.

Example 3 includes the computing system of Example 2, wherein the partition configuration is to further define a first set of hardware resources for the first operation and a second set of hardware resources for the second operation, and wherein the first set of hardware resources and the second set of hardware resources are different types of resources.

Example 4 includes the computing system of Example 1, wherein the one or more runtime conditions are to include one or more of an expected power consumption, a matrix sparsity or a hardware resource availability.

Example 5 includes the computing system of Example 1, wherein to select the partition configuration, the instructions, when executed, cause the computing system to search a lookup table for the input tensor size and at least one of the one or more runtime conditions.

Example 6 includes the computing system of any one of Examples 1 to 5, wherein the tensor operation is to include one or more of a matrix multiply operation, a convolution operation, a normalization operation, a rectified linear unit operation, or an exponential linear unit operation.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to detect a tensor operation in an application, wherein the tensor operation is to have an unspecified input tensor size, determine the input tensor size at runtime, and select a partition configuration for the tensor operation based at least in part on the input tensor size and one or more runtime conditions.

Example 8 includes the semiconductor apparatus of Example 7, wherein the partition configuration is to define a first set of matrix shapes for a first operation and a second set of matrix shapes for a second operation.

Example 9 includes the semiconductor apparatus of Example 8, wherein the partition configuration is to further define a first set of hardware resources for the first operation and a second set of hardware resources for the second operation, and wherein the first set of hardware resources and the second set of hardware resources are different types of resources.

Example 10 includes the semiconductor apparatus of Example 7, wherein the one or more runtime conditions are to include one or more of an expected power consumption, a matrix sparsity or a hardware resource availability.

Example 11 includes the semiconductor apparatus of Example 7, wherein to select the partition configuration, the logic coupled to the one or more substrates is to search a lookup table for the input tensor size and at least one of the one or more runtime conditions.

Example 12 includes the semiconductor apparatus of any one of Examples 7 to 11, wherein the tensor operation is to include one or more of a matrix multiply operation, a convolution operation, a normalization operation, a rectified linear unit operation, or an exponential linear unit operation.

Example 13 includes at least one computer readable storage medium comprising a set of executable program instructions, which when executed by a computing system, cause the computing system to detect a tensor operation in an application, wherein the tensor operation is to have an unspecified input tensor size, determine the input tensor size at runtime, and select a partition configuration for the tensor operation based at least in part on the input tensor size and one or more runtime conditions.

Example 14 includes the at least one computer readable storage medium of Example 13, wherein the partition configuration is to define a first set of matrix shapes for a first operation and a second set of matrix shapes for a second operation.

Example 15 includes the at least one computer readable storage medium of Example 14, wherein the partition configuration is to further define a first set of hardware resources for the first operation and a second set of hardware resources for the second operation, and wherein the first set of hardware resources and the second set of hardware resources are different types of resources.

Example 16 includes the at least one computer readable storage medium of Example 13, wherein the one or more runtime conditions are to include one or more of an expected power consumption, a matrix sparsity or a hardware resource availability.

Example 17 includes the at least one computer readable storage medium of Example 13, wherein to select the partition configuration, the instructions, when executed, cause the computing system to search a lookup table for the input tensor size and at least one of the one or more runtime conditions.

Example 18 includes the at least one computer readable storage medium of any one of Examples 13 to 17, wherein the tensor operation is to include one or more of a matrix multiply operation, a convolution operation, a normalization operation, a rectified linear unit operation, or an exponential linear unit operation.

Example 19 includes a method of operating a performance-enhanced computing system, the method comprising detecting a tensor operation in an application, wherein the tensor operation has an unspecified input tensor size, determining the input tensor size at runtime, and selecting a partition configuration for the tensor operation based at least in part on the input tensor size and one or more runtime conditions.

Example 20 includes the method of Example 19, wherein the partition configuration defines a first set of matrix shapes for a first operation and a second set of matrix shapes for a second operation.

Example 21 includes the method of Example 20, wherein the partition configuration further defines a first set of hardware resources for the first operation and a second set of hardware resources for the second operation, and wherein the first set of hardware resources and the second set of hardware resources are different types of resources.

Example 22 includes the method of Example 19, wherein the one or more runtime conditions include one or more of an expected power consumption, a matrix sparsity or a hardware resource availability.

Example 23 includes the method of Example 19, wherein selecting the partition configuration includes searching a lookup table for the input tensor size and at least one of the one or more runtime conditions.

Example 24 includes the method of any one of Examples 19 to 23, wherein the tensor operation includes one or more of a matrix multiply operation, a convolution operation, a normalization operation, a rectified linear unit operation, or an exponential linear unit operation.

Example 25 includes means for performing the method of any one of Examples 19 to 24.

Thus, technology described herein provides a unified programming interface that targets generic tensor operations and a runtime procedure that regranularizes the compute architecture based on available compute resources. As a result, applications map properly to the available tensor cores and are written only once.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A method comprising:
   obtaining information associated with a tensor operation in a deep neural network, the tensor operation comprising computations on input data;
   determining a size of an input tensor of the tensor operation based on the information, the input tensor being a data structure in which input data elements are arranged and having one or more dimensions, the size of the input tensor comprising a length of at least one of the one or more dimension; and
   partitioning the tensor operation based on the size of the input tensor and one or more hardware resources, wherein partitioning the tensor operation comprises partitioning the input tensor into a plurality of data tiles, a data tile is a portion of the input tensor, and the computations in the tensor operation are to be performed as at least part of a re-grained tile execution on the plurality of data tiles based on one or more runtime conditions of the one or more hardware resources.

2. The method of claim 1, wherein partitioning the input tensor into the plurality of data tiles comprises:
   determining one or more shapes of the plurality of data tiles.

3. The method of claim 1, wherein partitioning the tensor operation further comprises:
   partitioning a weight tensor of the tensor operation into a plurality of additional data tiles, wherein the computations comprise a computation on a data tile and an additional data tile.

4. The method of claim 1, wherein the one or more hardware resources comprise a processing unit for running the tensor operation.

5. The method of claim 1, wherein the one or more hardware resources comprise a memory for storing the input tensor or an output tensor of the tensor operation.

6. The method of claim 1, wherein the tensor operation comprises a matrix multiply operation.

7. One or more non-transitory computer-readable media storing instructions executable to perform operations, the operations comprising:
   obtaining information associated with a tensor operation in a deep neural network, the tensor operation comprising computations on input data;

determining a size of an input tensor of the tensor operation based on the information, the input tensor being a data structure in which input data elements are arranged and having one or more dimensions, the size of the input tensor comprising a length of at least one of the one or more dimension; and partitioning the tensor operation based on the size of the input tensor and one or more hardware resources, wherein partitioning the tensor operation comprises partitioning the input tensor into a plurality of data tiles, a data tile is a portion of the input tensor, and the computations in the tensor operation are to be performed as at least part of a re-grained tile execution on the plurality of data tiles based on one or more runtime conditions of the one or more hardware resources.

8. The one or more non-transitory computer-readable media of claim 7, wherein partitioning the input tensor into the plurality of data tiles comprises:

determining one or more shapes of the plurality of data tiles.

9. The one or more non-transitory computer-readable media of claim 7, wherein partitioning the tensor operation further comprises:

partitioning a weight tensor of the tensor operation into a plurality of additional data tiles, wherein the computations comprise a computation on a data tile and an additional data tile.

10. The one or more non-transitory computer-readable media of claim 7, wherein the one or more hardware resources comprise a processing unit for running the tensor operation.

11. The one or more non-transitory computer-readable media of claim 7, wherein the one or more hardware resources comprise a memory for storing the input tensor or an output tensor of the tensor operation.

12. The one or more non-transitory computer-readable media of claim 7, wherein the tensor operation comprises a matrix multiply operation.

13. An apparatus, comprising:

a computer processor for executing computer program instructions; and a non-transitory computer-readable memory storing computer program instructions executable by the computer processor to perform operations comprising:

obtaining information associated with a tensor operation in a deep neural network, the tensor operation comprising computations on input data, determining a size of an input tensor of the tensor operation based on the information, the input tensor being a data structure in which input data elements are arranged and having one or more dimensions, the size of the input tensor comprising a length of at least one of the one or more dimension, and partitioning the tensor operation based on the size of the input tensor and one or more hardware resources, wherein partitioning the tensor operation comprises partitioning the input tensor into a plurality of data tiles, a data tile is a portion of the input tensor, and the computations in the tensor operation are to be performed as at least part of a re-grained tile execution on the plurality of data tiles based on one or more runtime conditions of the one or more hardware resources.

14. The apparatus of claim 13, wherein partitioning the input tensor into the plurality of data tiles comprises:

determining one or more shapes of the plurality of data tiles.

15. The apparatus of claim 13, wherein partitioning the tensor operation further comprises:

partitioning a weight tensor of the tensor operation into a plurality of additional data tiles, wherein the computations comprise a computation on a data tile and an additional data tile.

16. The apparatus of claim 13, wherein the one or more hardware resources comprise a processing unit for running the tensor operation or a memory for storing the input tensor or an output tensor of the tensor operation.

17. The apparatus of claim 13, wherein the tensor operation comprises a matrix multiply operation.

18. The method of claim 2, wherein a shape of a data file comprises a width of the data file and a height of the data file.

19. The one or more non-transitory computer-readable media of claim 8, wherein a shape of a data file comprises a width of the data file and a height of the data file.

20. The apparatus of claim 14, wherein a shape of a data file comprises a width of the data file and a height of the data file.

* * * * *

UNITED STATES PATENT AND TRADEMARK OFFICE
CERTIFICATE OF CORRECTION

PATENT NO. : 12,086,657 B2
APPLICATION NO. : 18/305683
DATED : September 10, 2024
INVENTOR(S) : Sara Baghsorkhi et al.

It is certified that error appears in the above-identified patent and that said Letters Patent is hereby corrected as shown below:

In the Claims

In Column 14, Claim 18, Line 36, delete "file" and insert -- tile --, therefor.

In Column 14, Claim 18, Line 37, delete "file" and insert -- tile --, therefor.

In Column 14, Claim 18, Line 37, delete "file." and insert -- tile. --, therefor.

In Column 14, Claim 19, Line 39, delete "file" and insert -- tile --, therefor.

In Column 14, Claim 19, Line 40, delete "file" and insert -- tile --, therefor.

In Column 14, Claim 19, Line 40, delete "file." and insert -- tile. --, therefor.

In Column 14, Claim 20, Line 42, delete "file" and insert -- tile --, therefor.

In Column 14, Claim 20, Line 42, delete "file" and insert -- tile --, therefor.

In Column 14, Claim 20, Line 43, delete "file." and insert -- tile. --, therefor.

Signed and Sealed this
Fifteenth Day of October, 2024

Katherine Kelly Vidal
*Director of the United States Patent and Trademark Office*